United States Patent [19]

Towns

[11] 3,789,400

[45] Jan. 29, 1974

[54] APPARATUS FOR DESKEWING DATA SIGNALS IN A MULTI-TRACK RECORDING SYSTEM

[75] Inventor: Marion L. Towns, Bethany, Okla.

[73] Assignee: Honeywell Information Systems, Inc., Waltham, Mass.

[22] Filed: Jan. 26, 1973

[21] Appl. No.: 326,707

[52] U.S. Cl. .......................................... 340/174.1 B
[51] Int. Cl. ............................................. G11b 5/44
[58] Field of Search ............... 340/174.1 H, 174.1 B

[56] References Cited

UNITED STATES PATENTS 3,631,429 12/1971 King............................ 340/174.1 H
3,665,435 5/1972 Oyz et al......................... 340/174.1

*Primary Examiner*—Vincent P. Canney
*Attorney, Agent, or Firm*—Lloyd B. Guernsey

[57] ABSTRACT

Apparatus for deskewing data signals in a multi-track recording system uses a controlled oscillator and a deskewing buffer for each of the data tracks. Each buffer includes a data shift register, an error shift register and a marker shift register with each register having a plurality of storage cells. The apparatus uses the controlled oscillator and the data signals to produce marker bits in each buffer. The marker bits are used to synchronously move the error signals and data signals in the buffers and to generate a transfer signal each time a data character has been deskewed.

10 Claims, 4 Drawing Figures

PATENTED JAN 29 1974

3,789,400

SHEET 1 OF 4

PATENTED JAN 29 1974 3,789,400

SHEET 4 OF 4

WAVEFORMS AT OUTPUT TERMINALS

APPARATUS FOR DESKEWING DATA SIGNALS IN A MULTI-TRACK RECORDING SYSTEM

BACKGROUND OF THE INVENTION

This invention relates to magnetic recording systems and more particularly to apparatus for deskewing data signals in a multi-track recording system. The apparatus develops marker bits which causes data bits and error bits to move through the corresponding registers in synchronism with the marker bits. The marker bits also enable a gate which causes all of the data bits in a character to be available simultaneously at the data output terminals.

In modern data processing systems data is stored on magnetic tapes or disks for retrievel and use at a later time. This data includes alphanumeric data characters each of which may include a total of nine bits. When magnetic tape is used the characters are stored or "written" sequentially on a plurality of tracks along the length of magnetic tape which moves past a magnetic recording head assembly. These characters are recorded transversely along the tape with one bit of a character written on each of the tracks by a plurality of magnetic heads in the head assembly. In a nine track system nine heads simultaneously record nine bits of a data character with one bit in each of the nine tracks. When the data characters are "read" from the tape the data bits of the character may be skewed or read at slightly different times due to a misalignment of the magnetic heads or due to a "fishtail" movement of the tape. To recover the data bits into usable form each character must be deskewed, or the bits must be aligned so that all bits of a character are read simultaneously.

When the data is read from the magnetic tape defects in the magnetic tape or noise in the subsystem may cause errors in the retrieved data. The presence of these errors may be detected by checking the format of the signal in each of the tracks. It is possible to correct an error in the data when there is an error in only one track. When errors occur in two or more tracks the data must be reread or other corrective measures must be taken to recover the data. It is therefore necessary to provide an error signal when an error occurs in any of the tracks of data being read from the tape and to provide an alarm circuit which develops an output signal when errors occur simultaneously in two or more tracks.

The data bits may be binary ones or binary zeros. A binary one is commonly represented by a positive voltage and a binary zero is represented by a value of voltage near zero. Since a binary zero is represented by the same voltage as an absence of data bits it is difficult to determine if a data bit has been moved into the buffers or storage devices for each of the tracks. For this reason prior deskewing apparatus uses complicated logic circuits to aid in deskewing the data being read from magnetic tape. Such prior art deskewing apparatus is complicated and expensive to construct and is difficult to repair because the operation of the prior art is difficult for service personnel to understand.

It is, therefore, an object of this invention to provide a new and improved deskewing apparatus for use with multi-track magnetic recording media.

Another object of this invention is to provide deskewing apparatus having improved reliability.

A further object of this invention is to provide deskewing apparatus which is less expensive to construct than the prior art apparatus.

Still another object of this invention is to provide deskewing apparatus which is less complicated than prior art apparatus.

SUMMARY OF THE INVENTION

The foregoing objects are achieved in the present invention by providing apparatus for deskewing data signals which develops marker bits. The marker bits are used to synchronously move error signals and data signals in the buffers and to generate a transfer signal each time a data character has been deskewed.

DESCRIPTION OF THE PREFERRED EMBODIMENT

Figure 1:
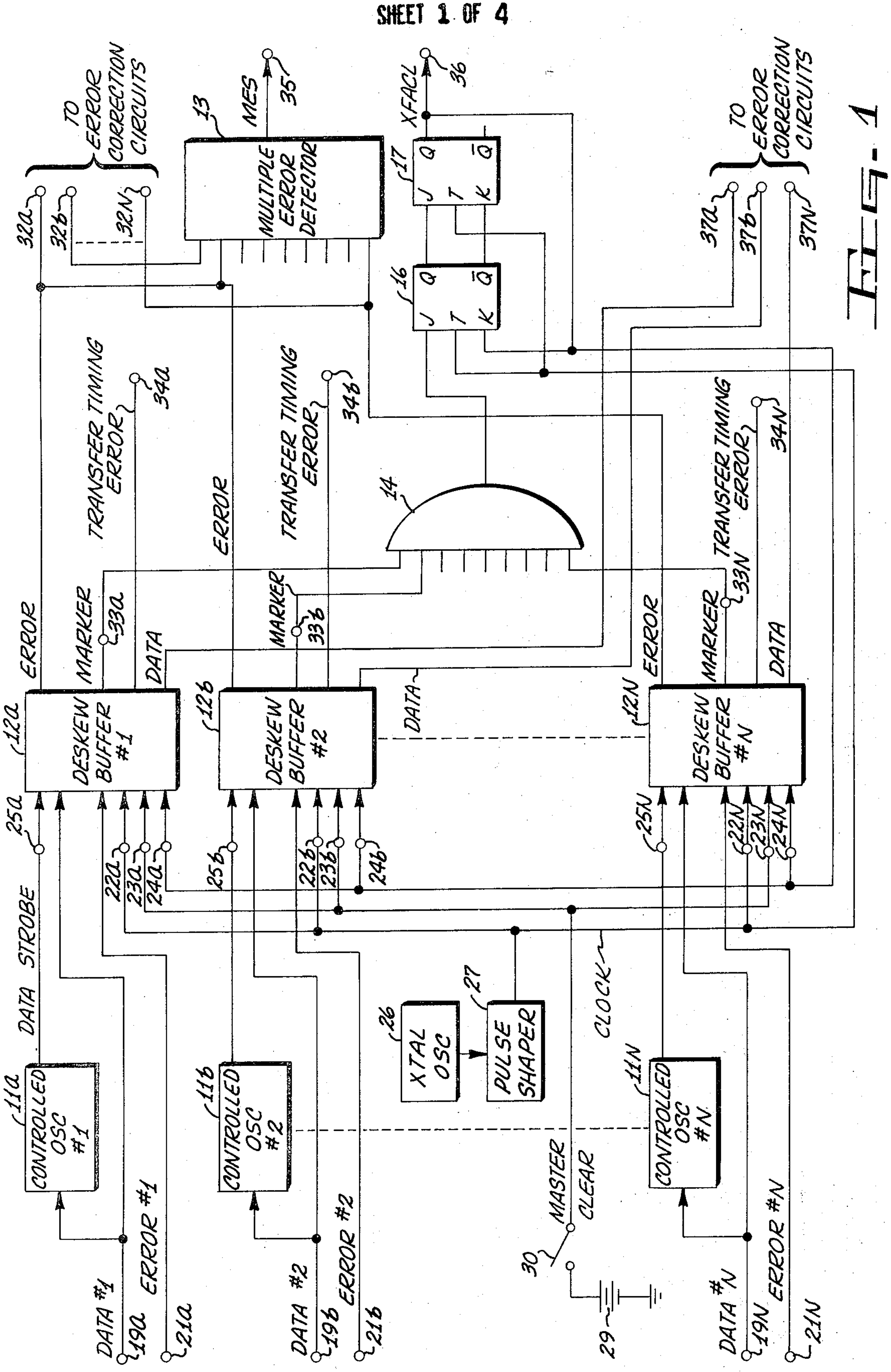
FIG. 1 is a block diagram of one embodiment of the present invention.

Each of the tracks of data provide data signals and error signals which are coupled to input terminals 19 and 21 of the apparatus for deskewing shown in FIG. 1. The data from each of the tracks is used to control the frequency of a control oscillator 11 and cause the oscillator to develop data strobe signals which are coupled to input terminal 25 of a deskew buffer 12. The operation of the control oscillator 11 is more fully described in a patent application filed May 30, 1972, entitled "Phase-Locked Oscillator," Ser. No. 260,335 by Edward R. Besenfelder and assigned to the assignee of the present invention. When there is an error in any of the data supplied to the deskew buffer 12 an error signal is coupled to the multiple error detector 13 and to the error output terminals 32. The error output terminals are coupled to error correction circuits (not shown). When there is an error in more than one of the tracks error signals to the multiple error detector 13 cause the detector to provide a multiple error signal to output terminal 35. The operation of the multiple error detector 13 is more fully described in U.S. Pat. No. 3,710,318 by William C. Powell entitled "Error Detection Circuit," issued Jan. 9, 1973 and assigned to the assignee of the present invention.

The data strobe signals developed by the control oscillators 11 are used to cause the data to be moved through a data shift register in each of the deskew buffers 12 to the output terminals 37. The data strobe signals also generate marker bits and cause the marker bits in each of the deskew buffers to be synchronously transferred through the marker shift registers to the final cell of each of the deskew buffers 12. When markers appear in each of the final cells of the marker registers, marker signals are developed at each of the marker output terminals 33 and applied to AND-gate 14. These marker signals cause AND-gate 14 to develop an output signal which sets J-K flip-flop 16 thereby providing a positive signal at the Q output lead of flip-flop 16. The signal at the Q output lead of flip-flop 16 causes J-K flip-flop 17 to be set. When J-K flip-flop 17 is set an XFACL signal developed at output terminal 36 is coupled to each of the input terminals 24 of the deskew buffers 12 causing the data to be moved out of each of the final cells of the data registers in deskew buffers 12.

Crystal oscillator 26 and pulse shaper 27 develop clock or timing pulses which are coupled to each of the deskew buffers 12 and to J-K flip-flops 16 and 17. The timing pulses supplied by the crystal oscillator 26 and pulse shaper 27 causes the data, the marker and the error signals to be synchronously moved through the shift registers in deskew buffers 12. The timing pulses on the T input terminals cause flip-flop 16 and 17 to be set when a signal is simultaneously applied to the J input terminal and causes these flip-flops to be reset when a signal is simultaneously applied to the K input terminal.

Figure 2:
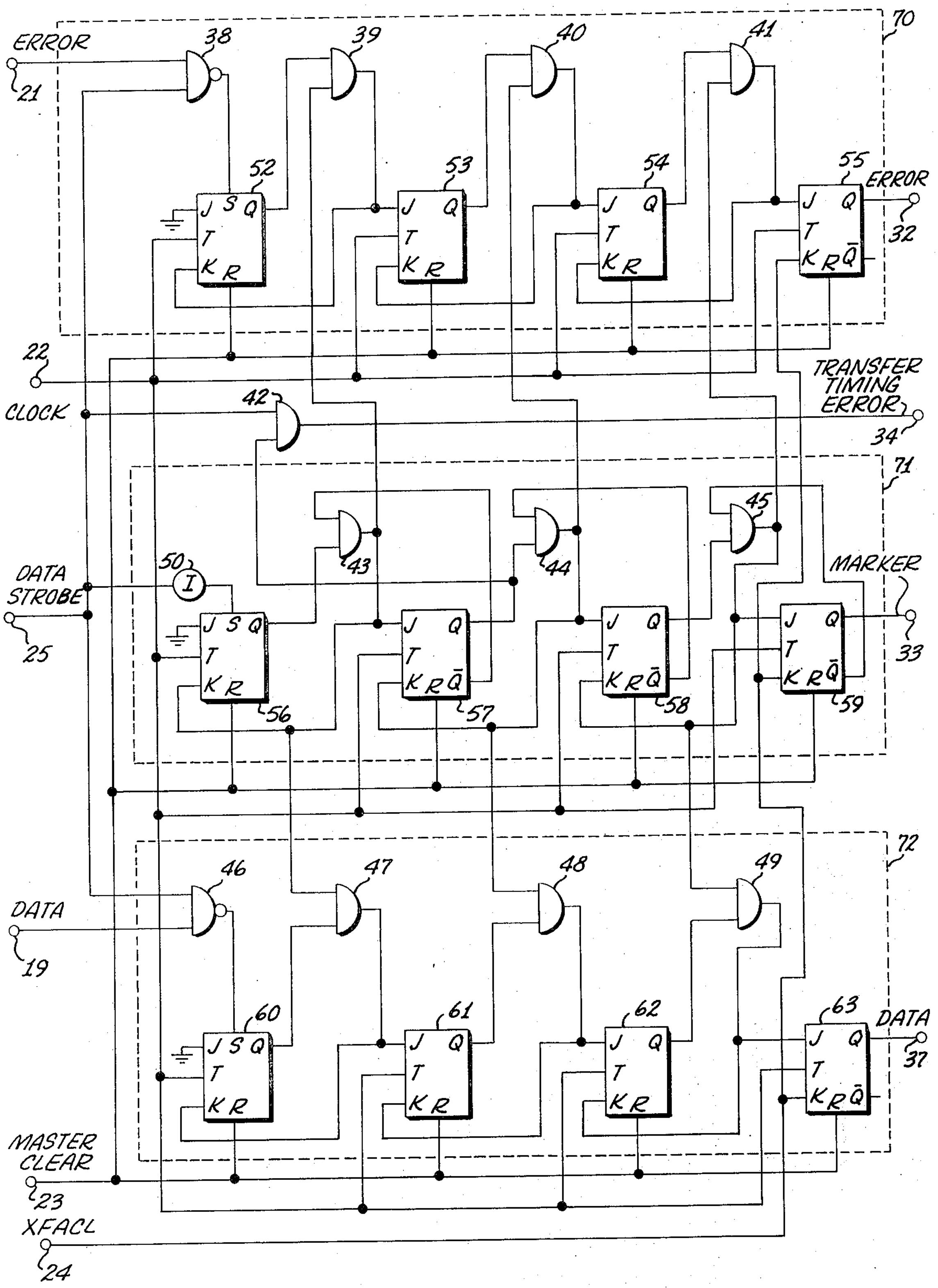
FIG. 2 shows details of the deskew buffers of FIG. 1.

Each of the deskew buffers 12 of FIG. 1 includes a plurality of AND-gates, NAND-gates and a plurality of storage cells such as the J-K flip-flops shown in FIG. 2. The AND-gates disclosed in FIG. 2 provide a logical operation of conjunction for binary one signals applied thereto. In the system disclosed, the binary one is represented by a positive signal, the AND-gate provides a positive output signal representing a binary one, when and only when, all of the input signals applied thereto are positive and represent binary ones. The symbols represented by the reference 39–45 represent AND-gates having two input leads. Such AND-gates deliver a binary one output signal only when each of the input signals applied thereto represent a binary one.

The J-K flip-flops or bistable multivibrators shown in FIGS. 1 and 2 are adapted to operate in either one of two stable states and transfer from the state in which they are operating to the other stable state upon the application of a trigger signal thereto. In one state of operation the J-K flip-flop represents the binary one (1-state) and in the other state, the binary zero (0-state). The three leads entering the left-hand side of the flip-flop symbol, for example, flip-flop 52 shown in FIG. 2, provide the required trigger signals. The upper lead, the J lead, provides a set signal, the lower lead, the K lead provides a reset input signal and the center lead provides the trigger signal. when the set input on the J lead is positive and the reset signal, on the K lead, is zero, a positive trigger signal of the T lead causes the flip-flop to change to the 1-state, if it is not already in the 1-state. When the reset signal is positive and the set signal zero, a positive trigger signal also causes the flip-flop to transfer to the zero state, if it is not already in the zero state.

The S lead entering the top of the flip-flop and the R lead entering the bottom of the flip-flop also provide set and reset signals respectively. When a zero voltage potential is applied to the S lead to flip-flop sets to the 1-state and remains in the 1-state as long as the zero voltage potential remains on the S lead irrespective of any signals on the J, T and K leads. When a zero voltage potential is applied to the R lead the flip-flop resets to the 0-state and remains in the 0-state as long as the zero voltage potential remains on the R lead irrespective of the J, T and K leads. Some flip-flops do not provide these S and R leads, for example, flip-flop 53 in FIG. 2 does not provide the S lead. The two leads leaving the right-hand side of the flip-flop deliver the output signals for each flip-flop. The upper output leads, the Q leads, deliver the one output signals of the flip-flops and the $\bar{Q}$ leads deliver the zero output signals.

An inverter provides the logical operation of inversion for an input signal applied thereto. The inverter provides a positive output signal representing a binary one when the input signal applied thereto is negative, representing a binary zero. Conversely, the inverter provides an output signal representing a binary zero when the input signal represents a binary one. Such an inverter is shown in FIG. 2 and is represented by the reference numeral 50. NAND-gates provide the same logical operation as an AND-gate followed by an inverter. The symbols represented by the reference numerals 38 and 46 represent NAND-gates having two input leads.

The operation of the deskew buffer of FIG. 2 will now be described in connection with the input waveforms shown in FIG. 3, the output waveforms shown in FIG. 4 and the complete deskewing apparatus shown in FIG. 1. Each of the deskew buffers includes an error register 70, a marker register 71 and a data register 72 as shown in FIG. 2. Prior to reading and deskewing the first character a a master clear or reset signal from the battery of reset signal source 29 of FIG. 1 is applied to the clear input signal terminal 23. This reset signal resets all of the flip-flops 52–63 of FIG. 2. When the error checking equipment (not shown) detects an error in the data signal a positive error signal is applied to the error input terminal 21 of the error register. The data signal which caused the error signal is applied to the data input terminal 19 of the data register 72 at the same time that the error signal is applied to input terminal 21. The next positive data strobe signal applied to the data strobe input terminal 25 causes the NAND-gates 38 and 46 to be enabled so that the error signal is gated into the first flip-flop 52 of the error register 70 and the data is gated into the first flip-flop 60 of the data register 72. At the same time that the error signal and the data signal are gated into their respective registers the data strobe signal sets the first flip-flop 56 of the marker register thereby providing a marker bit into the marker register 71.

The bits in the first error flip-flop, the first marker flip-flop and the first data flip-flop are all the result of the first data bit. Each of the data strobe signals sets flip-flop 56 as the data strobe signals are all positive. The error signal and the data signal may either be positive or have a value near zero voltage. When the data bit is incorrect the corresponding error bit is positive. When the data bit is correct the corresponding error bit has a value near zero. The data bit may represent either a binary one or a binary zero. A binary one is represented by a positive data bit and binary zero is represented by a voltage near zero. Any binary one causes flip-flop 60 to be set and a binary zero causes flip-flop 60 to remain reset.

When the first data strobe signal at input terminal sets flip-flop 56 and Q output lead of flip-flop 56 provides a positive signal to AND-gate 43. This positive voltage and a positive voltage from the $\bar{Q}$ output lead of flip-flop 57 causes gate 43 to provide a positive enabling signal to AND-gates 39 and 47 so that the first error bit is gated into the second error flip-flop 53 and the first data bit is gated into the second data flip-flop 61 by the next positive timing pulse. The second marker flip-flop 57 is also set by the signal from gate 43 and the timing signal. Thus, at this time the first data bit, the first error bit and the first marker bit have each moved into the second flip-flop in the respective registers.

The bit in marker flip-flop 57 causes AND-gate 44 to supply a positive signal to gate 40 of the error register, gate 48 of the data register and to the J input lead of the third marker flip-flop 58. This positive signal causes the first error bit to move into the third error flip-flop 54, the first data bit to move into the third data flip-flop 62 and the first marker bit to move into the third marker flip-flop 58 when the next timing pulse is received.

The bit in marker flip-flop 58 causes AND-gate 45 to enable gates 41 and 49 so that the first error bit, the first marker bit and the first data bit move into flip-flops 55, 59 and 63 respectively when the following timing pulse is received.

When a 9 bit character is used in the deskewing apparatus shown in FIG. 1 this same process of moving bits through the error, marker and data registers takes place in all 9 deskew buffers. Referring to FIG. 1 it can be seen that when the first marker bit of a first character moves into the final flip-flop of each of the marker registers in each of the buffers of FIG. 1 that the AND-gate 14 is enabled. When the AND-gate 14 is enabled the next timing pulse causes flip-flop 16 to be set. When flip-flop 16 is set a positive voltage of the Q output lead of flip-flop 16 causes flip-fop 17 to be set on the following timing pulse and provides a positive XFACL signal at output terminal 36. This XFACL signal tells equipment in the magnetic tape system that all of the bits of the first character are stored in the final flip-flops of each of the data registers and that these bits can be read into the computer system simultaneously. Thus, the data has been deskewed and all of the bits of the first character are available simultaneously at the output terminals **37*a*–37*n* of FIG. 1. The XFACL (transfer and clear) signal is coupled to input terminal 24 of each of the deskew buffers 12 of FIG. 1 and 2, causing flip-flops 55, 59 and 63** to be reset when the following timing pulse is received.

When signals representing the second character are applied to the input terminals **19*a*–19*n* of each of the deskew buffers 12*a*–12*n* this information is gated into each of the buffers 70–72** and is gated through the registers to the final flip-flop in each of the registers.

Figure 3:
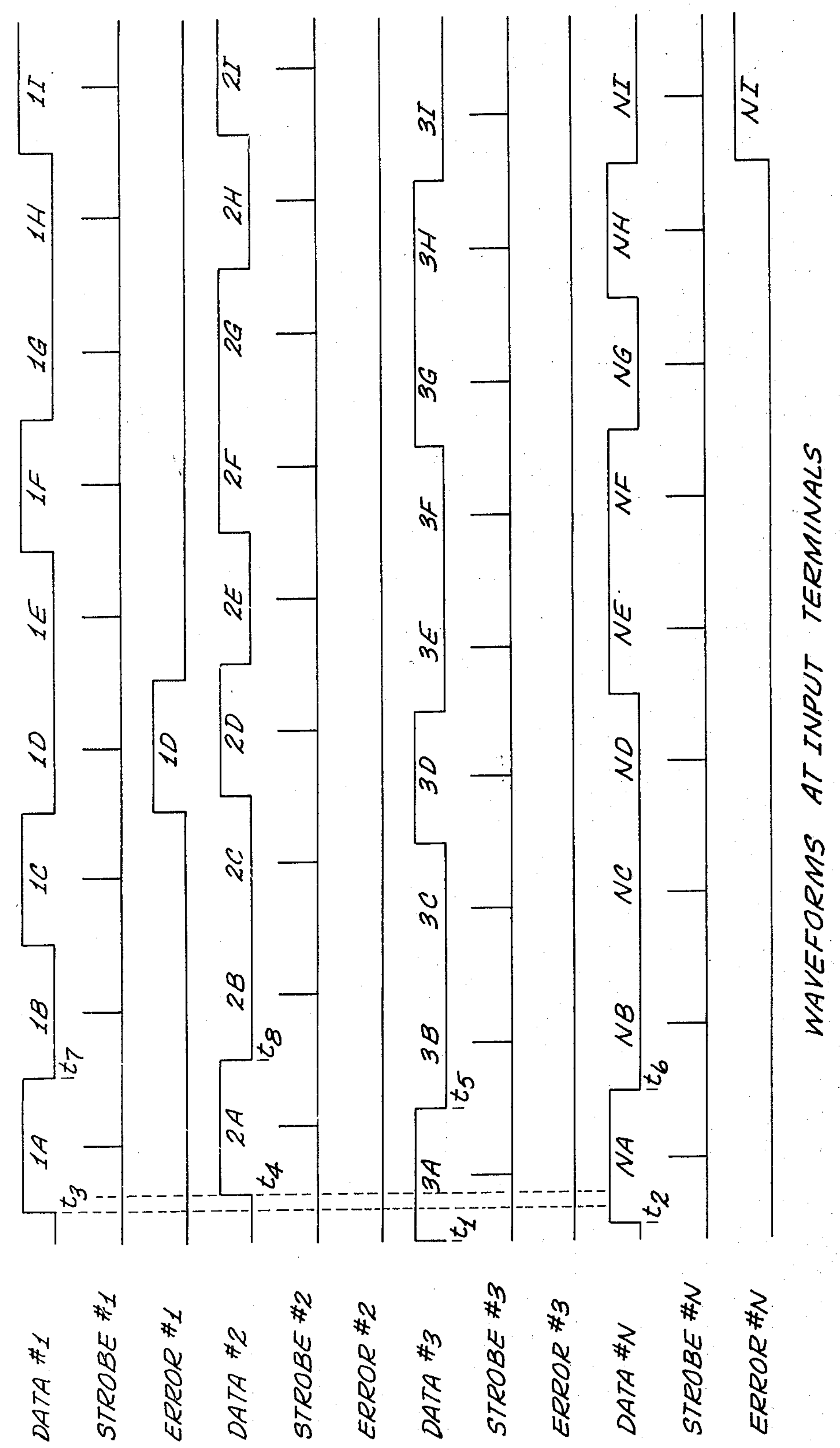
FIGS. 3 and 4 illustrate waveforms which are useful in explaining the operation of the invention shown in FIGS. 1 and 2.

FIG. 3 illustrates the timing of data signals, strobe signals and error signals at the input terminals of the deskew buffers **12*a*–12*n* of FIG. 1. Data No. 3 is shown arriving at the input terminal at time $t_1$ followed by data No. n, data No. 1 and data No. 2. Data No. 1 has an error in bit No. 1D which produces an error signal 1D. Data No. N has an error in bit No. N1.**

Figure 4:
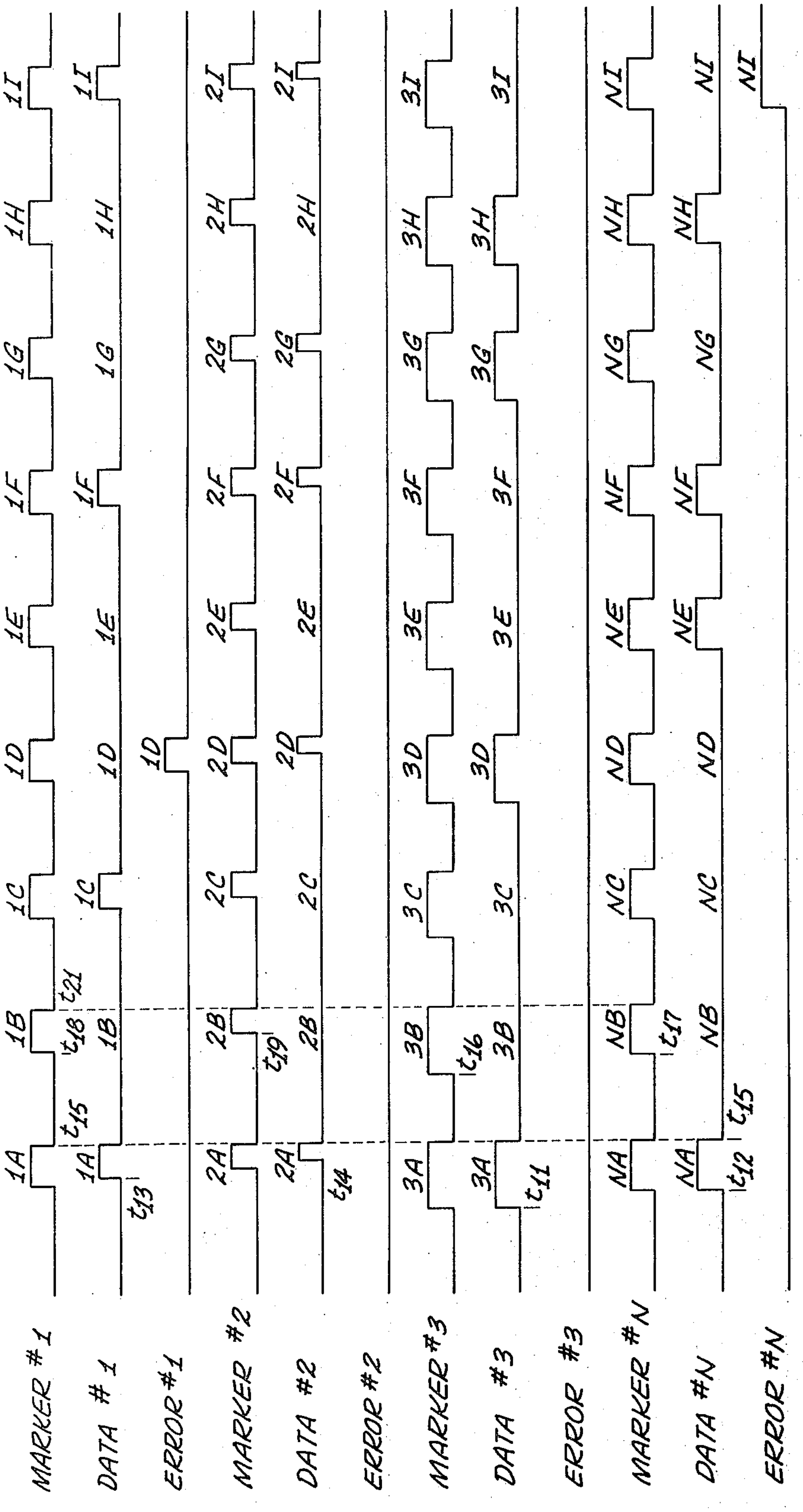

FIG. 4 illustrates the deskewed data signals at the output terminals **37*a*–37*n* of FIG. 1.** Between times $t_{11}$ and $t_{15}$ data bits are stored in final flip-flop of each of the data registers. At time $t_{15}$ the XFACL signal resets all of the final flip-flops.

The circuit of FIG. 2 provides a transfer timing error signal if a second data strobe signal is applied to input terminal 25 when a marker bit is in flip-flop 57. The time duration between data strobe signals should be long enough so that a first marker bit moves from the first marker flip-flop 56 to the third marker flip-flop 58 before a second marker bit is stored in flip-flop 56. If a data strobe signal is applied to input terminal 28 when a marker bit is in flip-flop 57 the signal from terminal 25 and a voltage from the Q output lead of flip-flop 57 cause AND-gate 42 to provide a warning or transfer timing error signal on output terminal 34. This signal causes the data processing system to take corrective action.

While the principles of the invention have now been made clear in an illustrative embodiment, there will be many obvious modifications of the structure, proportions, materials and components without departing from those principles. The appended claims are intended to cover any such modifications.

What is claimed is:

1. Apparatus for deskewing data signals in a multitrack recording system, for use with a plurality of sources of data signals, a plurality of sources of error signals and a source of timing signals, said apparatus comprising:

a plurality of deskewing buffers each having first, second, third and fourth input terminals and first, second, third and fourth output terminals, said first input terminal of each of said buffers being coupled to a corresponding one of said sources of error signals, said second input terminal of each of said buffers being coupled to a corresponding one of said sources of data signals, said third input terminal of each of said buffers being coupled to said source of timing signals;

a logic gate having a plurality of input leads and an output lead, said first output terminal of each of said buffers being connected to a corresponding one of said input leads of said gate; and means for coupling said output lead of said gate to said fourth input terminal of each of said buffers.

2. Apparatus for deskewing as defined in claim 1 including:

a multiple error detection circuit having an output lead and a plurality of input leads, said second output terminals of each of said buffers being connected to a corresponding one of said input leads of said error detection circuit.

3. Apparatus for deskewing as defined in claim 1 wherein said means for coupling includes:

first and second flip-flops each having first, second and third input leads and first and second output leads, said first input lead of said first flip-flop being connected to said output lead of said gate, said source of timing signals being connected to said second input leads of said first and said second flip-flops, said first output lead of said first flip-flop being connected to said first input lead of said second flip-flop, said second output lead of said first flip-flop being connected to said third input lead of said second flip-flop, said first output lead of said second flip-flop being connected to said third input lead of said first flip-flop and to said fourth input terminal of each of said buffers.

4. Apparatus for deskewing as defined in claim 1 including:

a multiple error detection circuit having an output lead and a plurality of input leads, said second output terminals of each of said buffers being connected to a corresponding one of said input leads of said error detection circuit;

and wherein said means for coupling includes:

first and second flip-flops each having first, second and third input leads and first and second output leads, said first input lead of said first flip-flop being connected to said output lead of said gate, said source of timing signals being connected to said second input leads of said first and said second flip-flops, said first output lead of said first flip-flop being connected to said first input lead of said second flip-flop, said second output lead of said first flip-flop being connected to said third input lead of said second flip-flop, said first output lead of said second flip-flop being connected to said third input lead of said first flip-flop and to said fourth input terminal of each of said buffers.

5. Apparatus for deskewing data signals in a multi-track recording system, for use with a plurality of sources of data signals, a plurality of sources of error signals and a source of timing signals, said apparatus comprising:

a plurality of deskewing buffers each having first, second, third, fourth and fifth input terminals and first, second, third and fourth output terminals, said first input terminal of each of said buffers being coupled to a corresponding one of said sources of error signals, said second input terminal of each of said buffers being coupled to a corresponding one of said sources of data signals, said third input terminal of each of said buffers being coupled to said source of timing signals;

a logic gate having a plurality of input leads and an output lead, said first output terminal of each of said buffers being connected to a corresponding one of said input leads of said gate;

means for coupling said output lead of said gate to said fourth input terminal of each of said buffers; and a plurality of control oscillators each having an input lead and an output lead, said input lead of each of said oscillators being coupled to a corresponding one of said sources of data signals, said fifth input terminal of each of said buffers being connected to a corresponding one of said output leads of said oscillators.

6. Apparatus for deskewing as defined in claim 5 including:

a multiple error detection circuit having an output lead and a plurality of input leads, said second output terminal of each of said buffers being connected to a corresponding one of said input leads of said error detection circuit.

7. Apparatus for deskewing as defined in claim 5 wherein said means for coupling includes:

first and second flip-flops each having first, second and third input leads and first and second output leads, said first input lead of said first flip-flop being connected to said output lead of said gate, said source of timing signals being connected to said second input leads of said first and said second flip-flops, said first output lead of said first flip-flop being connected to said first input lead of said second flip-flop, said second output lead of said first flip-flop being connected to said third input lead of said second flip-flop, said first output lead of said second flip-flop being connected to said third input lead of said first flip-flop and to said fourth input terminal of each of said buffers.

8. Apparatus for deskewing as defined in claim 5 including:

a multiple error detection circuit having an output lead and a plurality of input leads, said second output terminal of each of said buffers being connected to a corresponding one of said input leads of said error detection circuit; and wherein said means for coupling includes:

first and second flip-flops each having first, second and third input leads and first and second output leads, said first input lead of said first flip-flop being connected to said output lead of said gate, said source of timing signals being connected to said second input leads of said first and said second flip-flops, said first output lead of said first flip-flop being connected to said first input lead of said second flip-flop, said second output lead of said first flip-flop being connected to said third input lead of said second flip-flop, said first output lead of said second flip-flop being connected to said third input lead of said first flip-flop and to said fourth input terminal of each of said buffers.

9. Apparatus for deskewing data as defined in claim 5 wherein each of said buffers includes:

first, second and third registers each having a plurality of cells, said first input terminal of said buffer being connected to said first register, said second input terminal of said buffer being connected to said third register, said third and said fourth input terminals of said buffer being coupled to each of said registers, and fifth input terminal of said buffer being coupled to said second register; and a plurality of gating means each having first and second input leads and an output lead, said gating means being divided into first and second groups, said first input lead of each of said gating means in said first group being connected to a corresponding one of said cells in said first register, said output lead of each of said gating means in said first group being connected to a following cell in said first register, said second input lead of each of said gating means in said first group being coupled to a corresponding one of said cells in said second register, said first input lead of each of said gating means in said second group being connected to a corresponding one of said cells in said third register, said output lead of each of said cells in said second group being connected to a following cell in said third register, said second input lead of each of said cells in said second group being coupled to a corresponding one of said cells in said second register.

10. A deskew buffer for a multi-track data recording system for use with a reset signal source, a source of data signals, a source of strobe signals, a source of timing signals and a source of error signals, said buffer comprising:

a plurality of flip-flops each having first, second, third and fourth input leads and first and second output leads, said flip-flops being divided into first, second and third registers, said second input lead of each of said flip-flops being connected to said source of timing signals, said fourth input lead of each of said flip-flops being connected to said reset signal source, said first input lead of a first flip-flop in said second register being connected to said source of strobe signals; and a plurality of logic gates each having first and second input leads and an output lead, said gates being divided into first, second and third groups, said first input lead of a first gate in said first group being connected to said source of error signals, said output lead of said first gate in said first group being connected to said first input lead of a first flip-flop in said first register, said source of strobe signals being connected to said second input lead of said first gate in said first group and to said second input lead of a first gate in said third group, said second input lead of said first gate of said third group being connected to said source of data signals, said output lead of said first gate in said third group being connected to said first input lead of a first flip-flop in said third register, said first input lead of a first gate in said second group being connected to said first output lead of said first flip-flop in said first register, said second input lead of said first gate in said second group being connected to said second lead of a second flip-flop in said second register, said output lead of said first gate in said second group being connected to said first input leads of the second gates in said first and said third groups and to said first input lead of said second flip-flop in said second register, said second input lead of said second gate in said first group being connected to said first output lead of said first flip-flop in said third register, said output lead of said second gate in said first group being connected to said first input lead of a second flip-flop in said first register, said output lead of said second gate in said third group being connected to said first input lead of said second flip-flop in said third register.

* * * * *